Feb. 11, 1947.  V. P. FLEISS  2,415,584
MOTIVE POWER AND DRIVING MEANS FOR ROTATING PROPELLER OF HELICOPTERS
Filed Oct. 13, 1945  2 Sheets-Sheet 1

INVENTOR.
VICTOR P. FLEISS
BY J. Ledermann
ATTORNEY.

Feb. 11, 1947.  V. P. FLEISS  2,415,584
MOTIVE POWER AND DRIVING MEANS FOR ROTATING PROPELLER OF HELICOPTERS
Filed Oct. 13, 1945  2 Sheets-Sheet 2
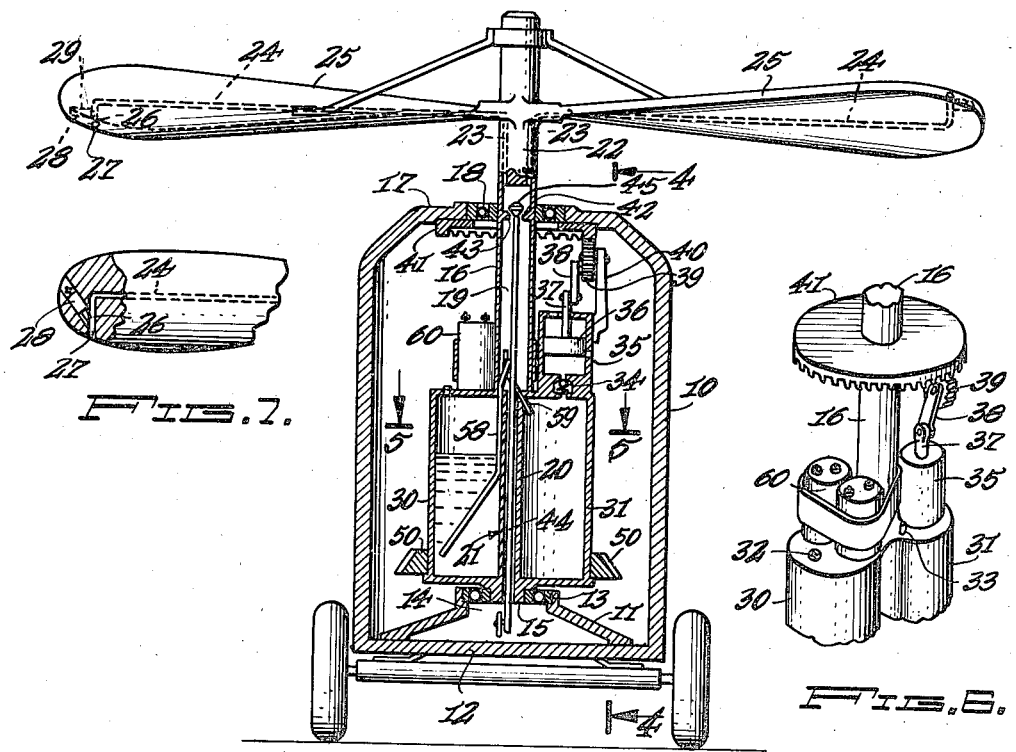
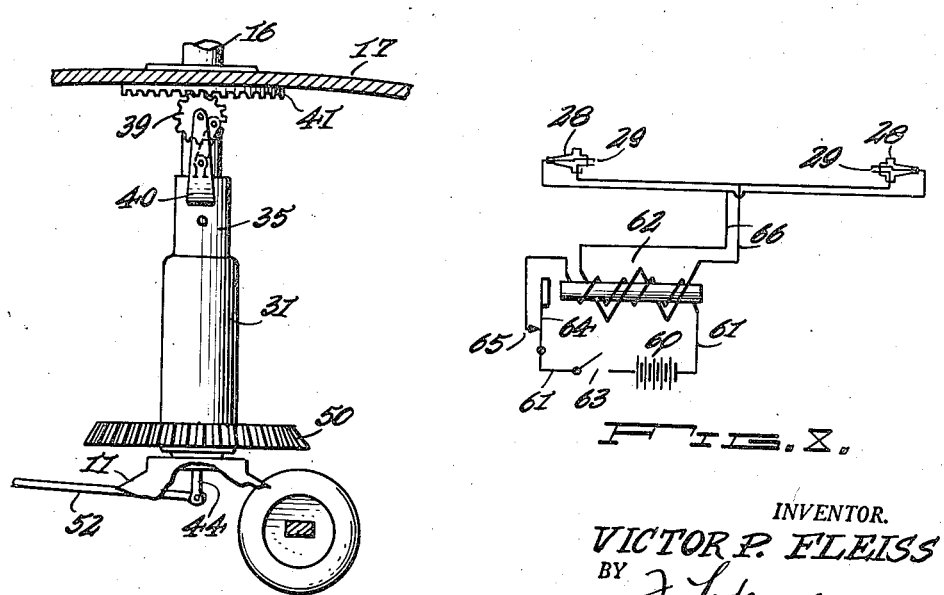
INVENTOR.
VICTOR P. FLEISS
BY
ATTORNEY.

Patented Feb. 11, 1947

2,415,584

UNITED STATES PATENT OFFICE 2,415,584

MOTIVE POWER AND DRIVING MEANS FOR ROTATING PROPELLER OF HELICOPTERS

Victor P. Fleiss, New York, N. Y.

Application October 13, 1945, Serial No. 622,195

6 Claims. (Cl. 244—17)

This invention relates to helicopter vehicles, and more particularly to the motive power and driving means therefor, and aims to provide a novel and efficient propulsion means for the lifting propeller of a helicopter whereby the power and efficiency are increased.

The above and other objects will become apparent in the description below, reference being had to the accompanying drawings, and reference numerals in the description refer to like-numbered parts on the drawings. It is to be noted that the drawings are intended for the purpose of illustration only, and that it is neither desired nor intended to limit the invention necessarily to the specific details of construction shown excepting insofar as they may be deemed essential to the invention.

Referring briefly to the drawings,

Fig. 3 is a cross-sectional view taken on the line 3—3 of Fig. 2.

Fig. 4 is a cross-sectional view taken on the line 4—4 of Fig. 3.

Fig. 6 is a fragmentary perspective view of the vertical propeller shaft and associated parts of the mechanism.

Fig. 7 is a fragmentary plan view of a propeller blade, with parts broken away and partly in section.

Fig. 8 is a wiring diagram of the ignition system.

Figure 1:
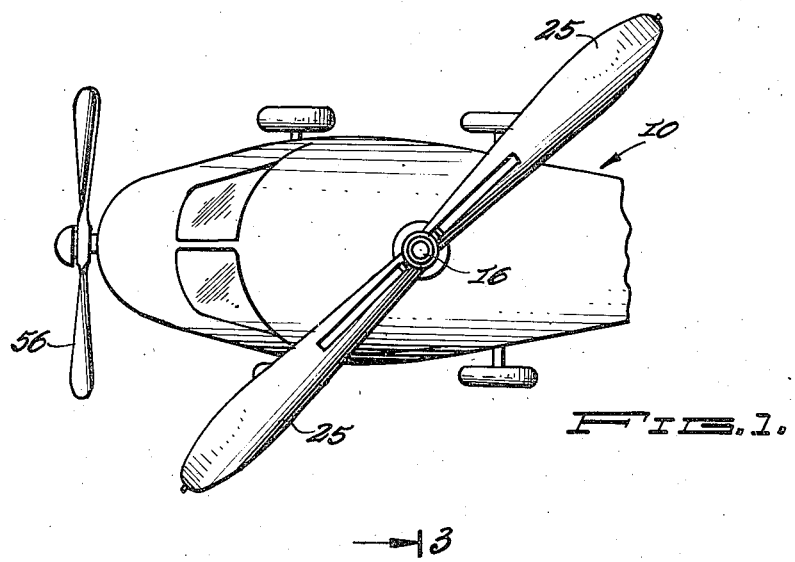
Fig. 1 is a fragmentary plan view of a helicopter vehicle, illustrating an application of the invention.
Figure 2:
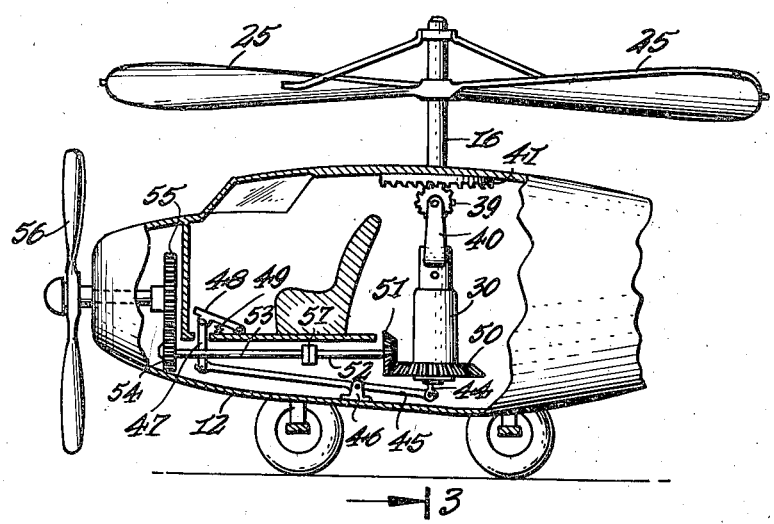
Fig. 2 is a side elevational view of Fig. 1, with parts broken away and partly in section to expose the interior.
Figure 5:
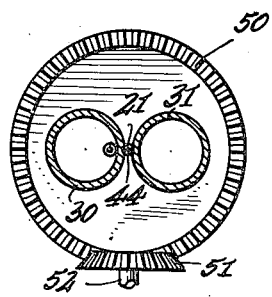
Fig. 5 is a cross-sectional view taken on the line 5—5 of Fig. 3.

Referring in detail to the drawings, the numeral 10 indicates the body of a wheeled vehicle, which may be of any type such as passenger or bus, or freight or truck, and which has a support or bracket 11 raised above the floor 12. A ball bearing 13 mounted in the opening 14 in the top of the bracket 11 rotatably supports the lower extremity 15 of a shaft 16 which extends through an opening in the roof 17 and through the ball bearing 18 supported in the roof. The shaft 16 is hollow throughout the intermediate portion of its length, as shown at 19, the lower portion 20 thereof being of reduced diameter and having the extension 21 of the hollow interior passage 19 thereof consequently also of reduced diameter.

The upper end 22 of the shaft 16 is solid excepting for two passages or channels 23 which pass therethrough and communicate with like channels 24 in the propeller blades 25. The channels 24 extend the length of the blades 25 and near the ends of the blades communicate with like channels 26 at right angles thereto, the latter extending through the following edges of the blades and having their ends open at 27 in the said edges. Spark plugs 28 are mounted in the blades so that their ignition terminals 29 lie in the channels 26.

Secured to and preferably made integral with the lower shaft extension 15 are a pair of tanks 30 and 31, the former serving as a fuel tank and having the plug 32, and the latter serving as a compressed air chamber and having the exhaust safety valve 33. Positioned upon and communicating therewith through a valve 34, is a pump housing or cylinder 35 having the piston 36 slidable therein. The piston rod 37 is pivoted to a crank rod 38 which in turn is pivoted at an off-center point to a pinion 39 supported on a bracket arm 40 extending from the pump housing. A ring gear 41 is rigid about the underside of the opening in the roof 17 and the pinion 39 is in mesh therewith.

A wall 42 having a passage and valve seat 43 through the center thereof, serves as a partition near the upper end of the passage 19 of the hollow shaft 16. A long rod 44 is slidably mounted in the passage 21 of the reduced shaft end 20 and extends upward through the opening 43, having a valve head 45 on its upper end adapted to close the passage 43 when in lowermost position. The lower end of the rod 44 extends below the bearing 15 and is pivoted to one end of a simple lever 45 fulcrumed at 46 to the floor 12. By means of a push rod or link 47 pivoted to the other end of the lever 45 and pivotally connected to a pivoted pedal 48 normally urged upward by a spring 49, the valve rod 44 is normally maintained in raised position whence the valve passage 43 is normally open.

At the base of the cylinders 30 and 31, a platform 50 is formed whose upper peripheral edge is beveled and toothed to provide a bevel gear in mesh with a bevel pinion 51 fixed on a shaft 52. A second shaft 53 in alignment with the latter has a pinion 54 thereon in mesh with a gear 55 to drive a vertical propeller 56. A clutch 57 joins the shafts 52 and 53 and may be provided with means, not shown, for engaging and disengaging of the same.

A pipe 58 leads from the fuel tank 30 into the shaft passage 19, and a pipe 59 also leads from the air tank 31 into the said passage, the upper end of the former being bent to a horizontal position and terminating just about the upper end of the latter to provide an atomizer as will be described below.

Dry electric cells 60 are mounted securely on the tank 32 and strapped against the shaft 16. As shown in the wiring diagram of Fig. 8, leads 61 from the battery 60 connect the primary of an induction coil 62 through a switch 63 with an armature 64 and armature contact 65, to provide the equivalent of a bell or buzzer circuit. The secondary of the coil is connected by leads 66 to the terminal contacts 29 of the spark plugs 28. It is apparent that closing the switch 63 will thus cause a rapid succession of sparks to jump in the plugs 28.

Assuming that the engine described has come to rest after operating for a while, an amount of pressure will be maintained on the air in the tank 31. Upon depression of the pedal 48 to raise the valve head 45, the said air under pressure will flow up the pipe 59, past the mouth of the pipe 58 and thereby, in the manner of an atomizer, draw fuel up the pipe 58 and send it on up the passage 19 as an atomized combustible mixture. The mixture will continue through the channels 23, 24, and 26 and out to the wing edge tips 27. If the switch 63 has been simultaneously closed, the sparks passing at the plugs 28 will ignite the mixture which will explosively leave the outlets 27, thereby causing rotation of the propeller. The switch 63 may be opened after the above propulsion has started, as the mixture will be automatically ignited as it reaches the outlets 27.

Rotation of the propeller carries with it the shaft 16 as well as the tanks 30 and 31 and gear 50, and it is obvious that with the pinion 39 thus riding around the gear 41 the pump 35 will operate to pump air into the tank 31. When it is desired to operate the forward propeller 56, the clutch 57 is engaged by the clutch-operating means above mentioned, not shown.

Obviously, modifications in form and structure may be made without departing from the spirit and scope of the invention.

I claim:

1. A machine having a frame including a floor and a roof, said roof having an opening therein, a vertical shaft projecting through and rotatably mounted in said roof opening, a fuel tank and an air compression tank secured rigidly to said shaft between said floor and roof, a reciprocating pump rigid on said air tank and communicating therewith, said shaft being hollow, pipes leading from said tanks into said shaft, a ring gear secured to said roof around said opening, a pinion in mesh with said gear, a bracket rigid on said pump supporting said pinion, said shaft having horizontal propeller blades thereon and having channels therein in communication with said hollow shaft, valve means for opening or closing the passage through said hollow shaft, said channels extending lengthwise in said blades and terminating in openings through the following edges thereof, spark plugs mounted in said blades adjacent said channel terminating openings, a source of electric supply, electric circuit-interrupting means in series with said source and spark plugs, said pipes having their terminating ends in said hollow shaft and juxtaposed to form an atomizer for said fuel.

2. The machine set forth in claim 1, said valve means comprising a baffle in said hollow shaft below the level of said blades, said baffle having an axial opening therethrough, a valve stem slidably mounted in said shaft and extending through said baffle opening, said stem having a valve head thereon adapted to close said baffle opening in lowermost position of said stem, and means for raising or lowering said stem.

3. A machine having a frame including a floor and a roof, said roof having an opening therethrough, a shaft rotatably supported on said floor and passing through said roof and having horizontal propeller blades thereon, a fuel tank, and air compressor tank and an air pump rigidly secured to said shaft, said shaft being hollow, said blades having channels extending therethrough, the open extremities of said channels passing through the following edges of said blades and having spark plugs thereadjacent, communicating means between said pump, said air tank and said fuel tank for forcing a mixture of fuel and air upward through said hollow shaft upon actuation of said pump, and means partly on said roof and partly on said shaft for actuating said pump upon rotation of said shaft, and an electrical source of supply and a circuit interrupter in series with said spark plugs.

4. The machine set forth in claim 3, having valve means for controlling the flow of said mixture through said shaft.

5. The machine set forth in claim 3, said pump actuating means comprising a ring gear on said roof surrounding said shaft, a bracket secured to one of said tanks and having a pinion pivotally mounted thereon, said pinion being in mesh with said ring gear, said pinion being operatively connected to said pump.

6. The machine set forth in claim 3, valve means for controlling the flow of said mixture through said shaft, said pump actuating means comprising a ring gear on said roof surrounding said shaft, a bracket secured to one of said tanks and having a pinion mounted thereon, said pinion being in mesh with said ring gear, said pinion being operatively connected to said pump.

VICTOR P. FLEISS.